(12) United States Patent
Abe et al.

(10) Patent No.: US 7,337,954 B2
(45) Date of Patent: Mar. 4, 2008

(54) READING AND WRITING APPARATUS FOR IC COINS

(75) Inventors: Hiroshi Abe, Iwatsuki (JP); Takahito Yamamiya, Iwatsuki (JP)

(73) Assignee: Asahi Seiko Co. Ltd, Tokyo (JP)

( * ) Notice: Subject to any disclaimer, the term of this patent is extended or adjusted under 35 U.S.C. 154(b) by 276 days.

(21) Appl. No.: 11/167,782

(22) Filed: Jun. 27, 2005

(65) Prior Publication Data

US 2006/0043168 A1  Mar. 2, 2006

(30) Foreign Application Priority Data

Sep. 1, 2004  (JP)  ............................ 2004-254527

(51) Int. Cl.
  *G06Q 40/00*  (2006.01)
(52) U.S. Cl. ...................... 235/379; 235/492
(58) Field of Classification Search ................ 235/381, 235/379, 375, 451, 492; 453/11, 58
  See application file for complete search history.

(56) References Cited

U.S. PATENT DOCUMENTS 5,489,014 A * 2/1996 Menoud ..................... 194/211
5,788,046 A * 8/1998 Lamah ........................ 194/317
5,797,475 A * 8/1998 Bointon et al. ............. 194/317
6,073,835 A * 6/2000 Ramadan ................... 235/78 G
6,116,403 A * 9/2000 Kiehl .......................... 194/217
6,708,811 B2 * 3/2004 Roscoe ....................... 194/215
6,786,408 B2 * 9/2004 Yamagishi et al. ......... 235/451
6,868,955 B2 * 3/2005 Mikami et al. ............. 194/350
2006/0003842 A1 * 1/2006 Kakinuma et al. ............ 463/43

FOREIGN PATENT DOCUMENTS

JP  2001-327747  11/2001
JP  2004-141490   5/2004

* cited by examiner

*Primary Examiner*—Ahshik Kim
(74) *Attorney, Agent, or Firm*—McGlew and Tuttle, P.C.

(57) ABSTRACT

So as to reduce the size of a reading and writing apparatus for IC coins and to lower the cost of a reading and writing apparatus for IC coins, a reading and writing apparatus for IC coins is provided that includes a reception portion that receives an IC coin with its surface facing a customer, and moves the IC coin in a predetermined direction to sends the IC coin to a reading and writing portion. The reading and writing portion retains the received IC coin with its surface visually confirmed by the customer. A reading and writing unit for the IC coin is placed at the reading and writing portion, and a sorting portion sorts the IC coin held at the reading and writing portion to a return portion.

18 Claims, 8 Drawing Sheets

READING AND WRITING APPARATUS FOR IC COINS

CROSS REFERENCE TO RELATED APPLICATIONS

This application claims the benefit of priority under 35 U.S.C. § 119 of Japan Application No. JP2004-254527 filed Sep. 1, 2004, the entire contents of which are incorporated herein by reference.

FIELD OF THE INVENTION

The present invention relates to an apparatus for reading and writing information stored in IC coins. Particularly, the invention relates to a reading and writing apparatus for IC coins that stores value information suitable for amusement machines and more particularly, a reading and writing apparatus for IC coins which is suitable for game machines that children play. The term "amusement machine" used in the present specification maybe a pin ball machine, a pachinko machine, video machine, a pin ball machine fitted with a slot machine, a slot machine, gaming machine or similar game/ride machine for amusement.

BACKGROUND OF THE INVENTION

Patent Document Japanese Laying-Open Patent Publication No. 2004-141490 (see FIG. 3 to 5, Page 2 to 5) presents a first conventional technique in which an amusement media lending/issuing machine for purchasing amusement media includes an IC coin drop-in slot through which IC coins, having stored therein value information, are dropped in. The machine also has an IC coin discharge outlet for discharging IC coins, an IC coin path that comes from the IC coin drop-in slot and gets to the IC coin discharge outlet, and a communication means that is arranged at the IC coin path.

Japanese Laying-Open Patent Publication No. 2001-327747 (see FIG. 3, Page 9) presents a second conventional technique from which it is known to provide an IC coin processing apparatus for an amusement machine for purchasing amusement media. A plurality of concave retention portions removably retain IC coins communicable under a non-contact state in the outer circumference direction. These retention portions are formed on the circle of a pivotable retention pivot body. An IC coin drop-in slot for dropping in IC coins is arranged at a position facing the outer circumference of the retention pivot body, and a communication means that communicates with IC coins retained by the retention pivot body under non-contact state is arranged at a predetermined position on the pivot trajectory of the retention portions of the retention pivot body.

Under the first conventional technique, an IC coin is dropped in through the IC coin drop-in slot with its vertically standing posture, and the IC coin rolls to reach the IC coin path communicable with the communication means, at which position the communication means reads and writes value information stored in the IC coin. Accordingly, a coin path on which an IC coin rolls is necessary, and there is raised a problem that a reading and writing apparatus for IC coins is enlarged in size. A customer or a game player cannot visually confirm that an IC coin is retained at the coin path. So, there is arranged a shutter that is electrically operated so that a game player does not drop in an additional IC coin through the drop-in slot. As a result, there is raised a problem that the reading and writing apparatus of the first conventional technique is expensive.

Under the second conventional technique, similarly, an IC coin is dropped in through the drop-in slot with its vertically standing posture, and is received by the retention portion of the retention pivot body, and then the retention pivot body is made to pivot by a predetermined angle to make the dropped in IC coin face the communication means, in which state the communication means communicates with a storage unit of the IC coin. Under the second conventional technique, the IC coin retained at the retention portion can communicated with the communication means when the retention pivot body is made to pivot by a predetermined angle. Accordingly, it is impossible for plural IC coins to communicate with the communication means simultaneously. However, it is required that the diameter of the retention pivot body be two times that of an IC coin or more, which enlarges the reading and writing apparatus in size as well as requires equipment to pivot the retention pivot body, raising a problem of high cost.

SUMMARY OF THE INVENTION

The first object of the present invention is to reduce the size of a reading and writing apparatus for IC coins. The second object of the present invention is to lower the cost of a reading and writing apparatus for IC coins.

So as to realize the objects, the reading and writing apparatus for IC coins according to an aspect of the invention is configured as follows. The reading and writing apparatus for I C coins includes a reception portion that receives an IC coin with its surface facing a customer, and moves the I C coin in a predetermined direction to send the IC coin to a reading and writing portion, the reading and writing portion that retains the received IC coin with its surface visually confirmed by the customer, a reading and writing unit for the IC coin placed at the reading and writing portion, and a sorting portion that it sorts the I C coin held at the reading and writing portion to a return portion.

Under this configuration, the IC coin can be placed at the reception portion with its surface facing a customer. Since the reception portion is moved, the I C coin can be moved to the reading and writing portion. At the reading and writing portion, the I C coin communicates with the reading and writing unit, and stores value information obtained by subtracting the utilization charge from stored value information. After playing, the IC coin is returned to the return portion under the operation of the sorting portion. Since the IC coin is moved to the reception portion, the reading and writing portion, and the return portion with its surface facing the customer, the depth of the reading and writing apparatus depends on the thickness of the IC coin. Accordingly, the reading and writing apparatus for IC coins can be reduced in size according to the present invention.

According to another aspect of the invention the reading and writing apparatus for IC coins has the sorting portion sort the IC coin to the return portion or to a storage portion. Under this configuration, when the reading and writing portion communicates with a communications device and value media stored in the IC coin comes to be zero, the IC coin is sorted to the storage portion by the sorting portion. As a result, the IC coin whose value information gets to zero is not returned to the customer, and the IC coin is not further utilized or utilized illegally.

According to another aspect of the invention, the reading and writing apparatus for IC coins has the reception portion with a slide plate that is provided with a setting opening which is slightly larger than the IC coin. Under this configuration, the IC coin is put on the setting opening with its surface facing the customer. When the slide plate is slid, the IC coin is moved to the reading and writing portion to be held at the reading and writing portion with its surface facing the customer. Under the simplified operation of putting the IC coin on the setting opening and sliding the slide plate, the IC coin can be held at the reading and writing portion.

According to another aspect of the invention, the reading and writing apparatus for IC coins has the slide plate such that it can reciprocate obliquely upward and backward from the customer side. Under this configuration, since the slide plate is moved obliquely upward and backward from the customer side, the IC coin placed on the setting opening can be moved to the reading and writing portion. Thus, motion along the depth direction is small, which can downsize the apparatus. What is required for the customer is moving the slide plate obliquely upward alone, which has advantage of simple operation.

According to another aspect of the invention, the reading and writing apparatus for IC coins allows the IC coin to be held at the reading and writing portion so it can be visually confirmed through the setting opening. Under this configuration, it is visually confirmed that the IC coin is placed at the reading and writing portion through the setting opening of the slide plate. Accordingly, since the customer can confirm that the IC coin is already dropped in, there is no need of arranging a shutter etc. for preventing overlapped drop-in, which can make it possible to manufacture the apparatus at lower cost.

According to another aspect of the invention, the reading and writing apparatus for IC coins may have the sorting portion such that it comprises a sorting member that is located under the reading and writing portion, and the sorting member can be selectively moved to a hold position located directly under the reading and writing portion, a return position moved to be located to the storage portion side, or a storage position moved to be located to the return portion side, from the hold position respectively. Under this configuration, when the sorting member is located at the hold position, the IC coin is held at the reading and writing position by the sorting member, when located at the return position, the IC coin is guided to the return portion, while when located at the storage position, the IC coin is guided to the storage portion. Accordingly, since the position of the IC coin is selectively determined depending on the position of the sorting member, the apparatus can be simply configured and can be manufactured at lower cost. Furthermore, the reading and writing apparatus can be reduced in size.

According to another aspect of the invention, the reading and writing apparatus for IC coins has a sorting member which is a plate with its lower portion pivotably supported, and is selectively pivoted such that the top thereof is located directly under the reading and writing portion at the hold position, the top thereof is moved to the storage portion side at the return position, and the top thereof is moved to the return portion side at the storage position. Under this configuration, since the sorting member is a plate that can pivot, the apparatus can be simply configured and can be manufactured at low cost. Furthermore, the reading and writing apparatus can be reduced in size.

According to another aspect of the invention, the reading and writing apparatus for IC coins has an auxiliary movement device that, when the reception portion is moved obliquely upward and backward from the customer side, goes into the setting opening to press the IC coin. Under this configuration, when the reception portion is normally moved obliquely upward and backward, the IC coin falls down due to its own weight to be held at the reading and writing portion. In case the IC coin jams at the setting opening of the reception portion and cannot fall down due to its own weight, the IC coin is pressed by the auxiliary movement device to be pulled out from the setting opening to be moved to the reading and writing portion. Thus, the IC coin can be surely moved to the reading and writing portion by the auxiliary movement device.

According to another aspect of the invention, the reading and writing apparatus for IC coins is selectively moved by a pair of solenoids which are arranged under the sorting member and between the path to the return portion and the path to the storage portion through links. Under this configuration, the sorting member is moved to the hold position, return position, and storage position when the solenoids are selectively magnetized. Thus, the sorting member has its position selectively determined under the simplified configuration using the solenoids and links, the apparatus can be manufactured at low cost.

The reading and writing apparatus for IC coins according to the present invention includes a reception portion that receives an IC coin with its surface facing a customer, and moves the IC coin in a predetermined direction to send the IC coin to a reading and writing portion, the reading and writing portion that retains the received IC coin with its surface visually confirmed by the customer, a reading and writing unit for the IC coin placed at the reading and writing portion, and a sorting portion that sorts the IC coin held at the reading and writing portion to a return portion or to a storage portion. The reception portion is a slide plate that is provided with a setting opening which is slightly larger than the IC coin, and the slide plate can reciprocate obliquely upward and backward from the customer side. The IC coin held at the reading and writing portion can be visually confirmed through the setting opening. The sorting portion is a sorting member that is located under the reading and writing portion, and the sorting member is a plate with its lower portion pivotably supported. The sorting member is selectively pivoted such that the top thereof is located directly under the reading and writing portion at a hold position, the top thereof is moved to the storage portion side at a return position, and the top thereof is moved to the return portion side at a storage position. The sorting member is selectively moved by a pair of solenoids which are arranged under the sorting member and between the path to the return portion and the path to the storage portion through links. There is further included an auxiliary movement device that, when the reception portion is moved obliquely upward and backward from the customer side, goes into the setting opening to press the IC coin.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
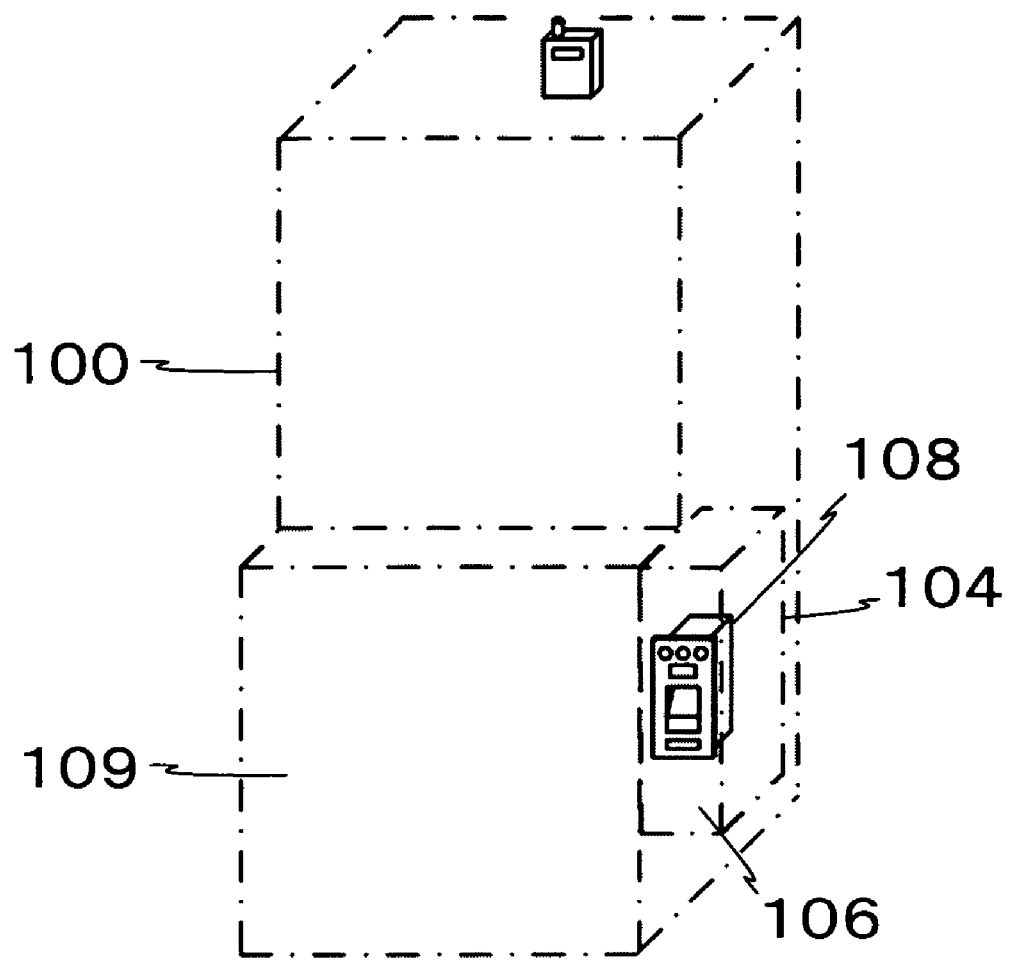
FIG. 1 is a perspective view showing a game machine provided with an IC coin reading and writing apparatus of an embodiment of the present invention.

Referring to the drawings in particular, as shown in FIG. 1, a game machine 100 has appended thereto a processing unit 104 for an IC coin 102. The IC coin processing unit 104 is in the shape of a box, and has an IC coin reading and writing apparatus 108 attached to a front vertical wall 106 thereof In other words, the IC coin processing unit 104 can be attached to the game machine 100 afterward. On the other hand, the IC coin reading and writing apparatus 108 can be attached to a front vertical wall 109 of the game machine 100.

Next, the IC coin reading and writing apparatus 108 will be explained with reference to FIG. 2 to FIG. 9. At the center of a rectangular front panel 110 extending vertically, there is formed a concave portion 114 with a slide portion 112 inclined downward and forward being the bottom. The concave portion 114 is formed at the back of a rectangular opening 116 that is smaller than a communication device to be described later.

At the front side of the slide portion 112, there is slidably arranged a reception portion 118, or a slide plate 120 in the embodiment, along the slide portion 112. The slide plate 120 is in the shape of a rectangular plate, whose thickness is two times that of the IC coin 102 or less, and the center of which is provided with a circular IC coin setting opening 122 whose diameter is slightly larger than that of the IC coin 102. Under this configuration, it is prevented that two IC coins 102 are simultaneously set at the setting opening 122.

The IC coin setting opening 122 may be of rectangular shape, triangular shape, lozenged shape, or elliptical shape, other than of circular shape. The slide plate 120 has at the lower front thereof an operation protrusion 124 in the shape of a trapezoid which protrudes perpendicularly to the slide plate 120. The slide plate 120 is retained by a stopper 126 (shown in FIG. 8) located at the lower side of the front panel 110 due to its own weight, and the setting opening 122 is stopped at a predetermined position located in the concave portion 114. In case of not coming down due to its own weight, the slide plate 120 can be made to come down forcibly by a biasing means such as a spring.

Figure 8:
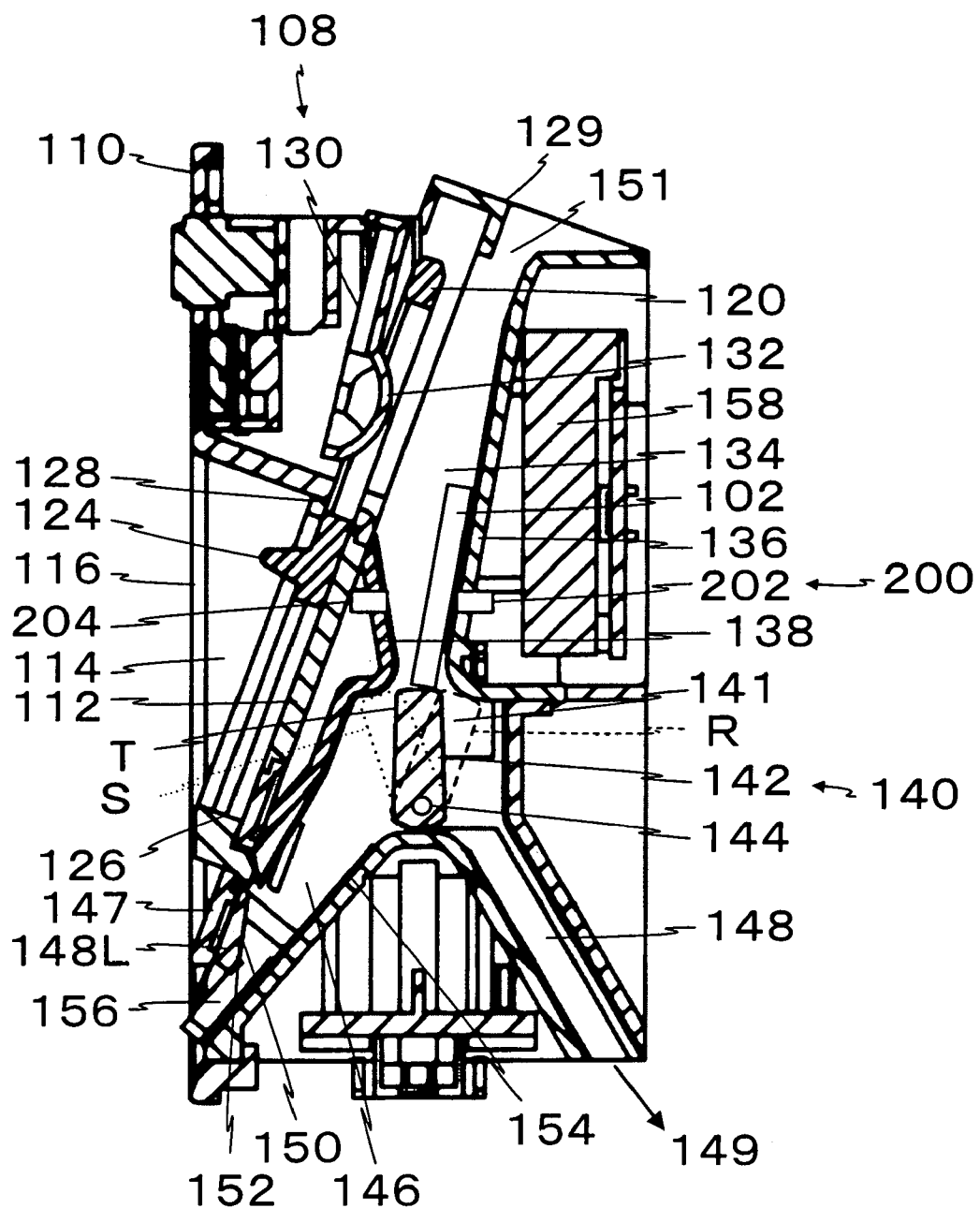
FIG. 8 is an A-A line sectional view in FIG. 2.

The slide plate 120 comes into the inside of a housing 129 through an opening 128 of the front panel 110 which is located at the upper side of the concave portion 114, and the setting opening 122 can be positioned in the housing 129. When the lower end of the slide plate 120 is retained by the stopper 126, the slide plate 120 is located at the setting standby position. As shown in FIG. 8, when the slide plate 120 is moved into the inside of the housing 129, the slide plate 120 is located at the setting position.

An auxiliary movement device 130 is so arranged within the housing 129 as to pivot with a shaft being the supporting point, which extends in a transverse direction at the top portion of the housing 129. At the lower side of the auxiliary movement device 130, there is formed a dome-shaped press portion 132 whose dome faces backward. The press portion 132 is so biased counterclockwise in FIG. 8 by its own weight or a biasing means, not shown, as to go into the setting opening 122 when the slide plate 120 is moved upward.

There is arranged a funnel-shaped reading and writing portion 134 at the back of the slide portion 112 against a game player. That is, the reading and writing portion 134 is a path which is formed by a backward plate 136 inclined downward and forward and a for ward plate 138 inclined downward and backward arranged at the back adjacent to the slide portion 112, and extends upward and downward t o converge downward.

Under the bottom of the reading and writing portion 134,there is arranged an sorting portion 140. The sorting portion 140 selectively sort IC coins 102 to a return outlet 156 being a return portion or to a storage portion 149, to be described later. In the embodiment, the sorting portion 140 includes a sorting portion path 141 and a sorting member 142. The sorting portion path 141 extends upward and downward directly under the reading and writing portion 134. The sorting member 142 is arranged at the sorting portion path 141.

The sorting member 142 is in the form of a rectangular plate, and can pivot clockwise and counterclockwise shown in FIG. 8 with a shaft 144 being the pivot center, which protrudes from both lower sides of the sorting member 142 and is pivotably held by the housing 129. Following the sorting portion path 140, there are formed a return path 146 extending obliquely downward and forward to the side of the front pane 110 and a storage path 148 extending obliquely downward and backward. The storage path 148 communicates with the storage portion 149 for storing IC coins 102. The reading and writing portion 134 and the sorting portion path 141 communicate approximately in the vertical direction to configure the path for IC coins 102. The return path 146 and the storage path 148 extend in the leftward and downward direction and in the rightward and downward direction in FIG. 8 from the bottom of the sorting portion path 141, respectively. The reading and writing portion 134, sorting portion path 141, return path 146 and storage path 148 have their diameter made slightly larger than that of the IC coin 102. Furthermore, those paths have their thickness (left and right direction in FIG. 8) made larger than two times that of the IC coin 102. This is because the IC coin 102 can go down without being jammed when falling down due to its own weight. Furthermore, above the upper end of the reading and writing portion 134, there is arranged an automatic drop-in slot 151 for IC coins 102. The IC coins 102 are automatically supplied to the reading and writing portion 134 through the automatic drop-in slot 151.

At walls determining those paths, it is desired that protrusions that extend in the movement direction of IC coins 102 or upward and downward in parallel with predetermined distances be arranged so as to reduce the friction resistance raised between the paths and the light IC coins 102 to make the IC coins 102 slide easily. At the lower side of the forward plate 138 determining the return path 146, on a plate 147 that is so detachably attached to the housing 129 as to come across the return path 146, there are formed a pair of retention pieces 148L and 148R facing the left and right ends of the return path 146.

These retention pieces 148L, 148R are formed into approximately right triangles, as shown in FIG. 8, and hypotenuses 150 are so formed as to reduce the thickness of the return path 146, and the spacing between crownings 152 of the retention pieces and a slide panel 154 located thereunder is so designed as to be slightly smaller than the thickness of the IC coin 102. That is, when the IC coin 102 comes down through the return path 146, the lower two circumference points of the IC coin 102 are retained by the hypotenuses 150 to prevent the IC coin 102 from falling down.

In this case, the lower part of the IC coin 102 is exposed to the return outlet 156 that is formed between the lower part of the plate 147 and the slide panel 154. When taking out the IC coin 102, the IC coin 102 is slid downward to move the hypotenuses 150 by pinching the lower part of the exposed IC coin 102 using fingers, that is, since the plate 147 which is made of resin and has elasticity is deformed by the IC coin 102, the IC coin 102 can be moved. As a result, the IC coin 102 can pass through the path between the crownings 152 and the slide panel 154. It is desirable that the plate 147 be made of polyacetal resin and unitedly molded together with the retention pieces 148L, 148R so as to reduce the friction resistance against the IC coin 102. In case the thickness of the IC coin 102 is changed, the plate 147 can be replaced with another one with crownings 152 of different height to easily adapt to the situation.

At the rear side of the backward plate 136 of the reading and writing portion 134, there is arranged a reading and writing unit 158 for the IC coin 102. It is desirable that the reading and writing portion 134 be distantly located as far as possible from the front panel 110, and the reading and writing unit 158 be located near the reading and writing portion 134. This configuration is intended to prevent an unauthorized access to the IC coin 102 from outside.

Figure 2:
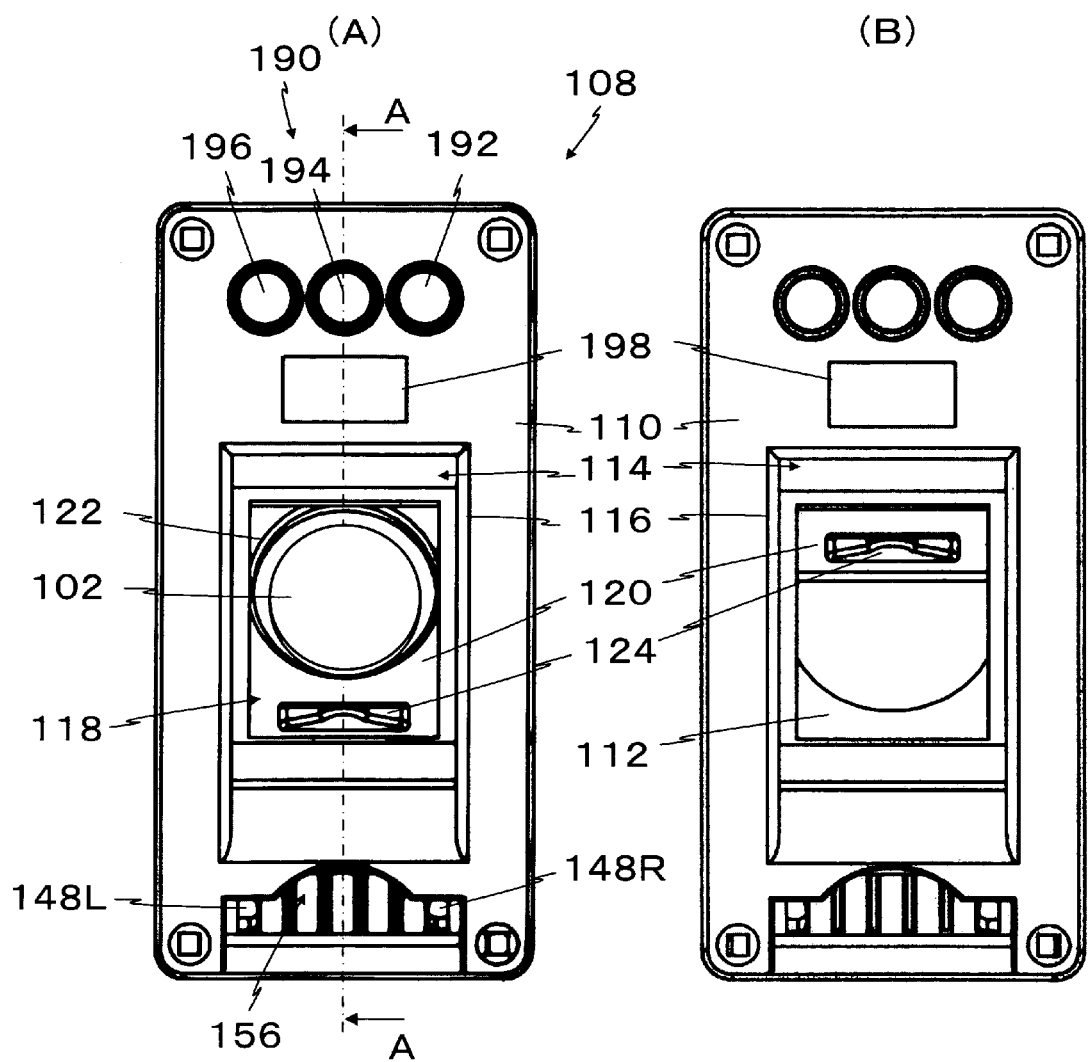
FIG. 2 is a front view of the IC coin reading and writing apparatus of the embodiment of the present invention where A indicates the state in which a slide plate is located at the setting point, while B indicates the state in which the slide plate is located at the loading point.
Figure 3:
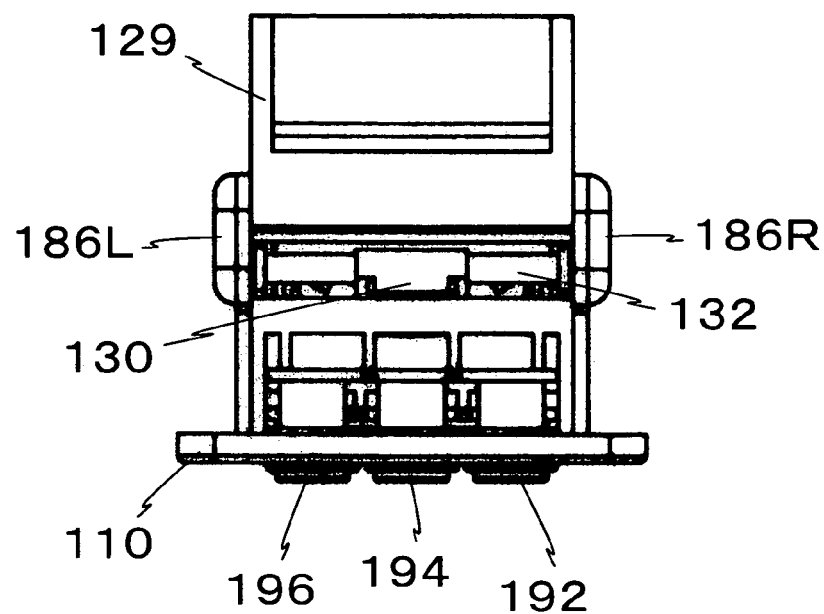
FIG. 3 is a plan view of the IC coin reading and writing apparatus of the embodiment of the present invention.
Figure 4:
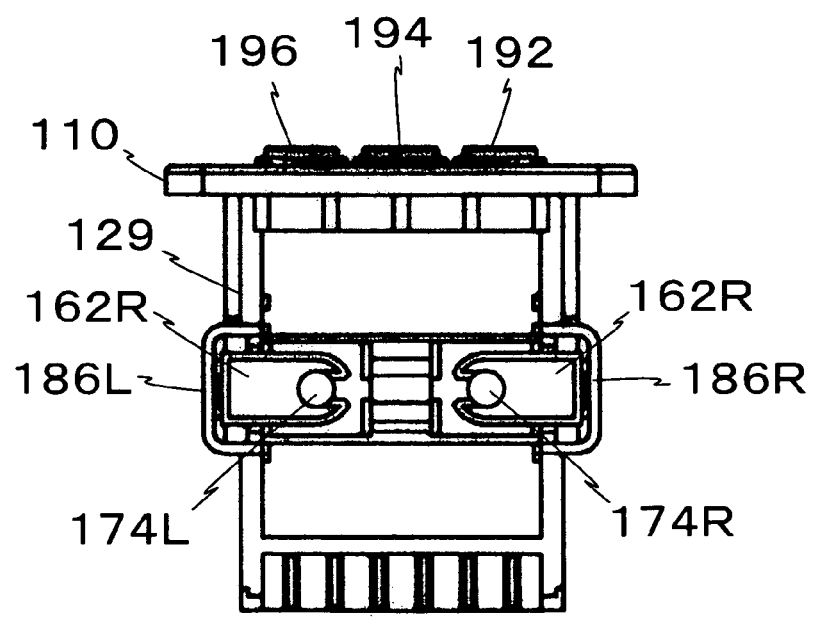
FIG. 4 is a bottom view of the IC coin reading and writing apparatus of the embodiment of the present invention.

As shown in FIG. 8, when being moved obliquely upward and backward to the reading and writing portion 134, the IC coin 102 is naturally moved away from the front panel 110, which configuration is desirable in preventing an unauthorized access. Furthermore, it is desirable that the slide portion 112 and the forward plate 138 be made of transparent material. This is because the IC coin 102 held at the reading and writing portion 134 can be visually seen through the setting opening 122, slide portion 112, and forward plate 138, which gives a game player a feeling of security and prevents another IC coin 102 from being dropped in additionally. As shown in FIG. 2, the upper edge of the return outlet 156 of the front panel 110 is cut off, forming an arch, which makes it easy to pinch the lower edge of the IC coin 102 and take out the IC coin 102 from the return outlet 156.

Figure 5:
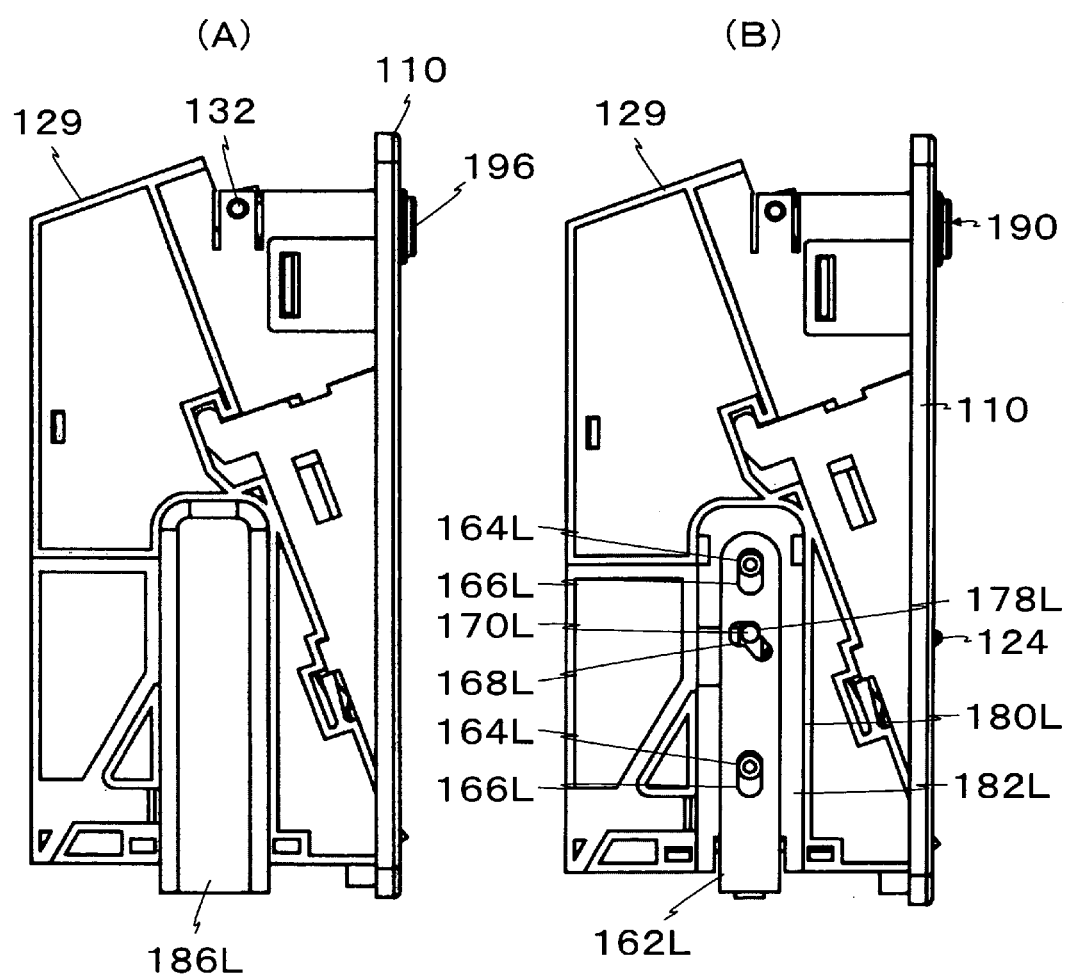
FIG. 5 is a left side view of the IC coin reading and writing apparatus of the embodiment of the present invention where A indicates the state in which a left cover is fixed, while B indicates the state in which the left cover is detached.
Figure 6:
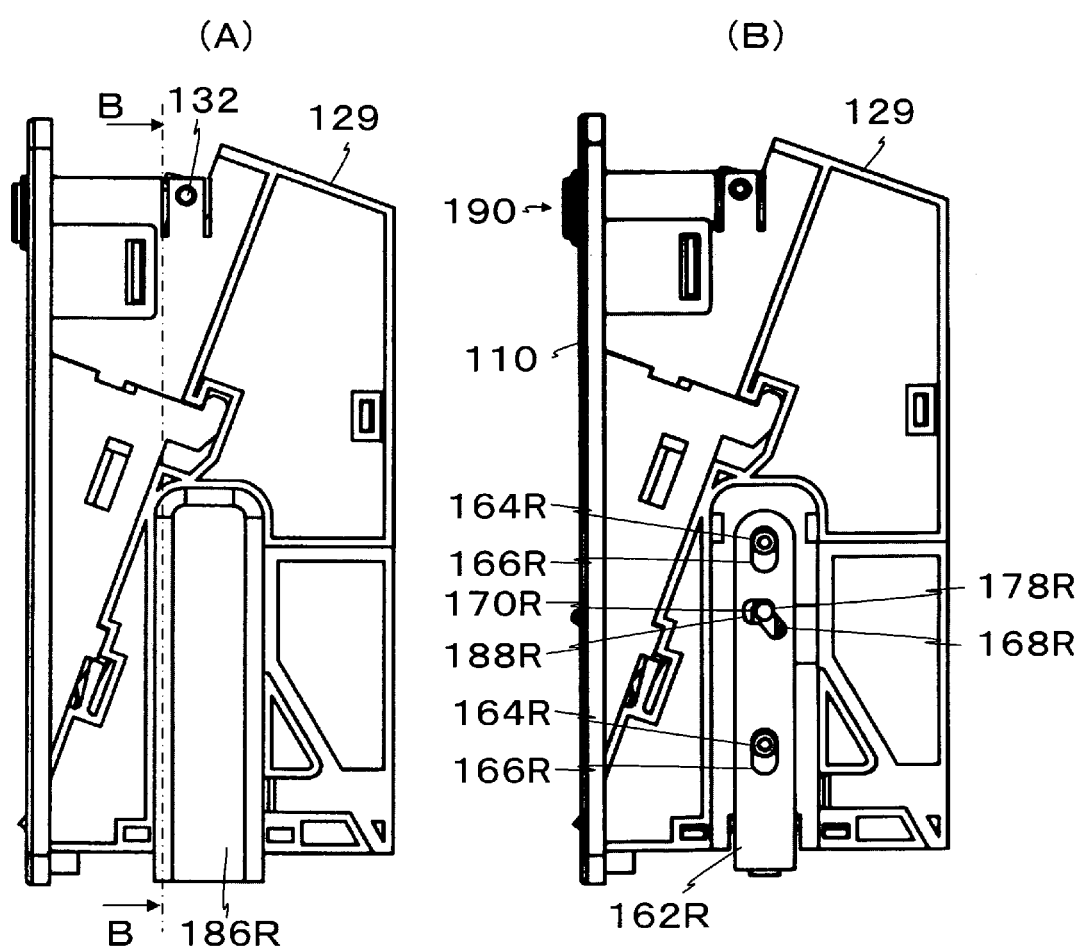
FIG. 6 is a right side view of the IC coin reading and writing apparatus of the embodiment of the present invention where A indicates the state in which a right cover is fixed, while B indicates the state in which the right cover is detached.
Figure 7:
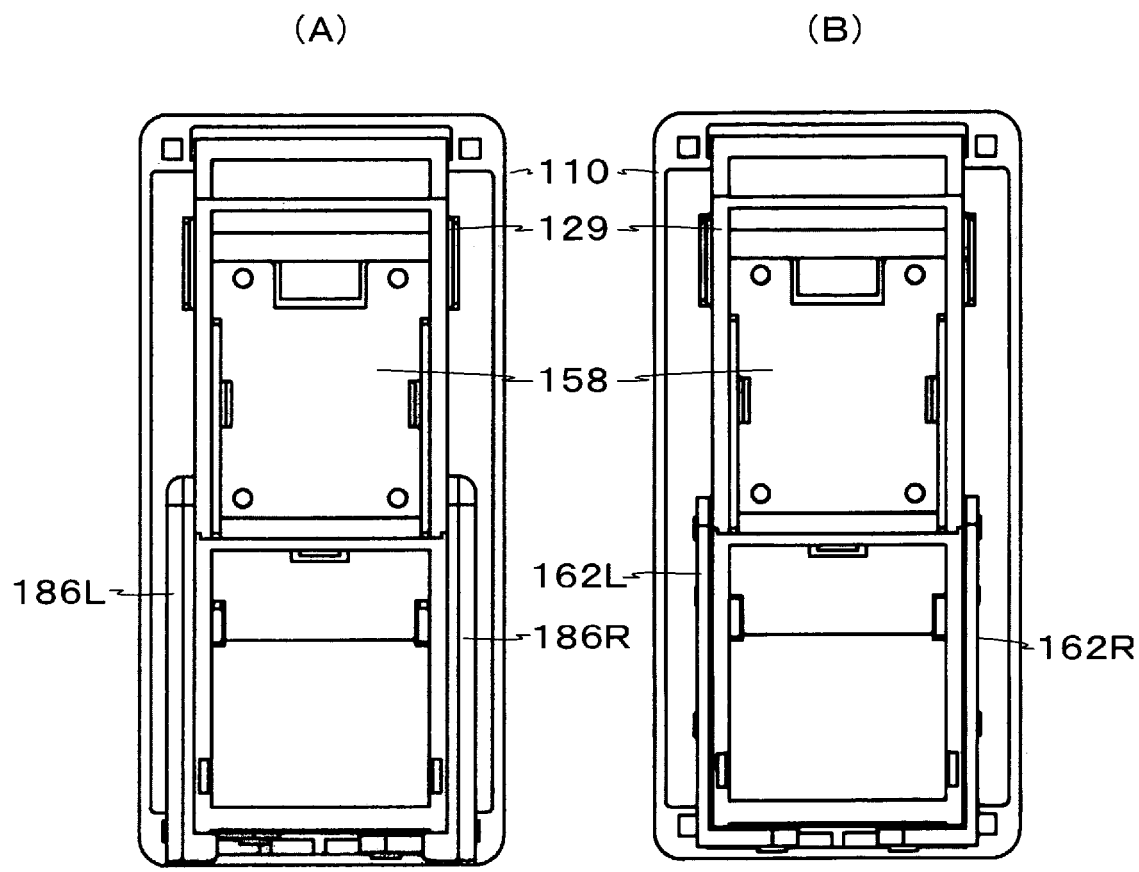
FIG. 7 is a rear view of the IC coin reading and writing apparatus of the embodiment of the present invention A indicates the state in which a cover is fixed, while B indicates the state in which the cover is detached.
Figure 9:
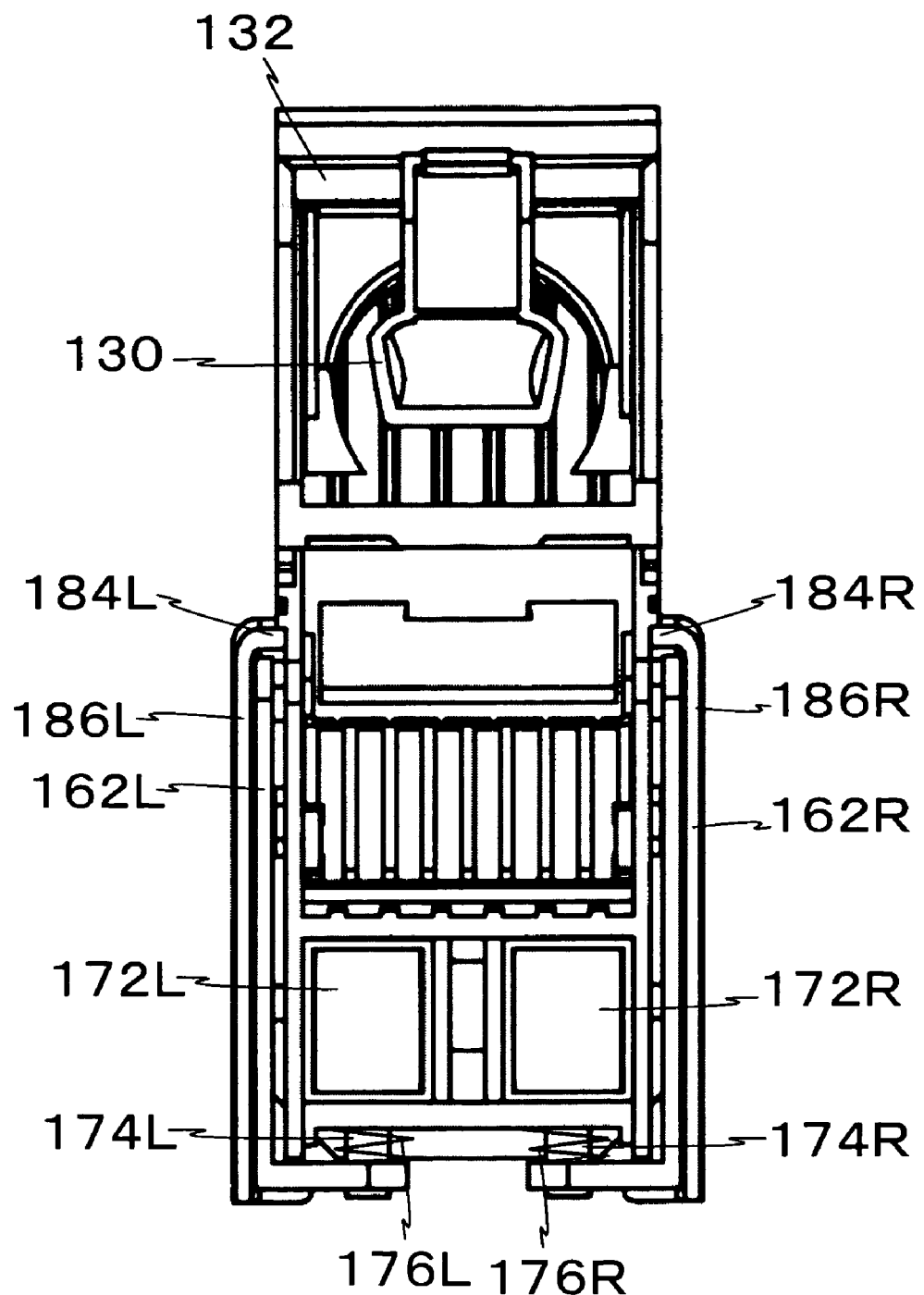
FIG. 9 is a B-B line sectional view in FIG. 6.

Next, a drive mechanism 160 of the sorting member 142 will be explained with reference to FIG. 5, FIG. 6 and FIG. 9. There is slidably arranged an L-shaped left drive plate 162L along the left wall of the housing 129. The left drive plate 162L has its left guide openings 166L slidably hooked up upward and downward on left guide pins 164L protruding from the left wall of the housing 129.

The left guide pins 164L and the left guide openings 166L are formed at two positions at the minimum to make the left drive plate 162L move linearly. The left drive plate 162L has its middle portion provided with a left cam opening 168L, which is formed obliquely against the motion direction thereof In the left cam opening 168L, there is slidably inserted a left driven pin 170L that protrudes laterally from the upper side surface of the sorting member 142.

The lower edge of the left drive plate 164L which extends horizontally, is fixed to a left plunger 174L of a left solenoid 172L. The left plunger 174L is biased by a left spring 176 along the protruding direction. When the left solenoid 172L is demagnetized, the left drive plate is located at the lowest position and is retained by a left front stopper 178L of the left spring 164L.

The left drive plate 162L can reciprocate within a long channel 182L formed by an inverted-U-shaped rib 180L formed at the left wall. The long channel 182L is covered by a pan-shaped left cover 186L having an outer edge rib 184L. The left cover 186L is detachably attached to the left wall to guide the left drive plate 162L to prevent it from bending.

There is also arranged a right drive plate 162R1 which is symmetrically formed against the left drive plate and is configured similarly. Concerning the right drive plate 162R1 similar parts or components are indicated with the same reference numerals with their appended "L" replaced with "R", and detailed explanation of which will be omitted. Accordingly, when a right solenoid 172R is demagnetized, a right driven pin 170R is retained by a right rear stopper 178R. When the left solenoid 172L is magnetized, the left drive plate 164L is moved upward.

Thus, the left driven pin 170L is moved rightward shown in FIG. 8 due to the left cam opening 168L. Consequently, the sorting member 142 is moved to a storage position S shown by a dotted line in FIG. 8, and the reading and writing portion 134 communicates with the storage path 148 through the sorting portion path 140. At this time, running into a right cam opening 168R to move to a right recess opening 188R, which extends near horizontally, the right driven pin 170R is not constrained. When the right solenoid 172R is magnetized, the right drive plate 162R is moved upward, and the right driven pin 170R is moved rightward shown in FIG. 8 due to the right cam opening 168R.

Thus, since the sorting member 142 is moved to a return position R shown by a chained line in FIG. 8, the reading and writing portion 134 communicates with the return path 146 through the sorting portion path 140. When the right solenoid 172R and the left solenoid 172L are demagnetized, the sorting member 142 is located at a hold position T shown by a full line in FIG. 8. At the hold position T, the top of the sorting member 142 is located directly under the reading and writing portion 134 so as to prevent the IC coin 102 from falling down and hold the IC coin 102 at the reading and writing portion 134. The right driven pin 170R is retained by the right rear stopper 178R and the left driven pin 170L is retained by the left front stopper 178L, having their positions retained.

Next, an operation selection unit 190 will be explained referring to FIG. 2. The operation selection unit 190 is provided with a function of returning the IC coins 102 and selecting the processing of game charge. At the upper portion of the front panel 110, there are arranged three selection buttons aligned in a transverse direction.

These selection buttons are switches of a press-button system, and a single pulse signal is output when one of the buttons protruding from the front panel 110 is pressed from the front side, and a built-in LED is turned on or turned off so as to inform a game player of the selection. There is arranged a right switch 192 being a cancel switch provided with a function of returning the IC coin 102 held at the reading and writing portion 134 to the return outlet 156.

That is, when the cancel switch 192 is pressed, the right solenoid 172R is magnetized, and as described above, the sorting member 142 is moved to the return position R, and the IC coin 102 is led to the return path 146 to be returned to the return outlet 156. The switch 192 may be red.

There is arranged a center button being, for example, a whole play switch 194 for selecting the whole amount of value information of the IC coin 102, which subtracts the whole amount of value information of the IC coin 102, and value information of zero is newly stored. The switch 194 may be white. There is arranged a left selection switch 196 being a switch for one play, and accounting of play charge for one play is performed every pressing operation.

That is to say, when turning on the switch 196 once, value information necessary for one game is subtracted from value information stored in the IC coin 102, and then thus obtained new value information which has undergone the subtraction is written in a storage unit of the IC coin 102 by the reading and writing unit 158. The switch 196 may be green. The use of different colors is intended to prevent incorrect selection.

These accounting switches may be configured by only the switch 196 that performs accounting of play charge for one play. Furthermore, there may be arranged another switch for an extra charge in addition to the accounting for one play or the whole amount. That is, it is required that at least one accounting switch be arranged. There is arranged a display unit 198 using liquid crystal between the operation selection unit 190 and the concave portion 114.

The display unit 198 displays value information that is stored in the IC coin 102 and read out by the reading and writing unit 158. The value information is, for example, amount of money or number of times that a game player can play games which are stored in the IC coin 102. There is arranged an IC coin sensor 200 at the reading and writing portion 134. The IC coin sensor 200 senses the IC coin 102 located at the reading and writing portion 134.

The IC coin sensor 200 is a transmission type photo electric sensor that includes, for example, a flood light unit 202 arranged at the backward plate 136 and a light—sensitive unit 204 arranged at the forward plate 138. Instead of the transmission type, a reflection type sensor may be used, and furthermore, a mechanical sensor may be used. So as to prevent a sensing error, it is desirable that a plurality of sensors 200 be arranged.

As shown in FIG. 8, when the IC coin 102 is held at the reading and writing portion 134, the sensor 200 senses the IC coin 102. Due to this sensing, the LEDs of the switches 192, 194, and 196 are turned on. This tuning on informs a game player that the IC coin 102 is held at the reading and writing portion 134. This gains the player's attention to prevent a further IC coin 102 from being dropped in.

When the sensor 200 senses the IC coin 102, the reading and writing unit 158 is made to operate to communicate with the IC coin 102 to read out value information stored therein. Then, the value information is displayed by the display unit 198. Thus, a game player confirms the display of the display unit 198, and can select the switch 196 for one play or the switch 194 for the whole play.

Tuning on of the switches 192, 194 and 196 or communication of the reading and writing unit 158 based on the sensing by the sensor 200 can be controlled by a control device configured by a microcomputer built in the reading and writing apparatus 108 or a microcomputer for controlling a game machine.

Next, the operation of the embodiment will be explained. Firstly, a game player puts the IC coin 102 in the setting opening 122. That is, the game player places the IC coin 102 in the setting opening 122 such that the front surface or the rear surface thereof can be seen. Thus, the IC coin 102 is held in the setting opening 122 with its backside leaning against the slide portion 112 as well as with its lower edge being supported by the slide plate 120.

Next, the protrusion 124 is pushed up to move the slide plate 120 upward along the slide portion 112. At this time, since the auxiliary movement device 130 is made to pivot clockwise slightly shown in FIG. 8 by the upper edge of the slide plate 120, the slide plate 120 can be moved. When the setting opening 122 goes into the reading and writing portion 134, being not supported by the slide portion 112, the IC coin 102 tilts toward the reading and writing portion 134 due to its own weight.

Furthermore, since the auxiliary movement device 130 goes into the setting opening 122 due to the pivot force along the counterclockwise direction shown in FIG. 8, the IC coin 102 is pressed toward the reading and writing portion 134 by also the auxiliary movement device 130. Then, when the lower edge of the IC coin 102 faces the reading and writing portion 134, the IC coin 102 moves to the reading and writing portion 134 and falls down due to its own weight.

Usually, since the sorting member 142 stands still at the hold position T directly under the reading and writing portion 134, the falling IC coin 102 has its lower edge supported by the upper edge of the sorting member 142, and is retained within the reading and writing portion 134. When the IC coin 102 is located within the reading and writing portion 134, the IC coin 102 is in close proximity to the reading and writing unit 158.

The held IC coin 102 blocks a light from the flood light unit 202 of the sensor 200, and thus the light-sensitive unit 204 comes to receive no light, thereby a hold signal is output. The LEDs of the switches 192, 194 and 196 are turned on due to the hold signal. A game player comes to know that the IC coin is held at the reading and writing portion 134 when the switches 192, 194 and 196 are turned on. The slide plate 120 is pulled down to be stopped by the stopper 126 due to its own weight, biasing means, or handling by a game player.

The IC coin 102 held at the reading and writing portion 134 can be visually confirmed by a game player through the setting opening 122, slide portion 112, and forward plate 138. Accordingly, this gains the player's attention and informs the player that the IC coin 102 is already held, preventing a further IC coin 102 from being dropped in. Based on the hold signal, the reading and writing unit 158 sends out a carrier signal, and communicates with the IC coin 102 held at the reading and writing portion 134.

Under this communication, value information stored in a storage unit of the IC coin 102 is read out t o be displayed on the display unit 198. Even though it is tried to rewrite value information of the IC coin 102 by approximating an IC coin reading and writing unit for unauthorized reading and writing from the side of the front panel 110, since the IC coin 102 held at the reading and writing unit 158 is closer to the reading and writing unit 158, the value information under the influence of electric waves of the reading and writing unit 158 cannot be rewritten.

In other words, it is impossible to illegally rewrite value information stored in the IC coin 102. When the cancel switch 192 is pressed, the solenoid 172R is magnetized for a predetermined period of time. Accordingly, since the lever 162R is moved upward, the pin 170R is moved rightward in FIG. 6 due to the cam opening 168R, the sorting member 142 is moved to the return position R shown in FIG. 8.

Consequently, being not supported by the sorting member 142, the IC coin 102 at the reading and writing portion 134, falls down to the return path 146 through the sorting portion path 141 due to attraction of gravity. At the return path 146, the IC coin 102 has its lower edge retained by the retention pieces 148L and 148R, and is stopped with its lower edge portion exposed to the return outlet 156. When a game player pinches and pulls down the lower edge of the IC coin 102, the plate 147 bends. Then, the IC coin 102 can pass through the path between the retention pieces 148L and 148R and the slide panel 154, and can be taken out from the return outlet 156.

When the left solenoid 172L is magnetized, since the sorting member 142 is moved to the storage position S, the IC coin 102 at the reading and writing portion 134 is guided to the storage path 148 to be stored in the storage portion 149. That is, when the switches 194 and 196 are turned on and stored value information comes to be zero, the IC coin 102 falls down through the storage path 148 due to its own weight to be stored in the storage portion 149.

While specific embodiments of the invention have been shown and described in detail to illustrate the application of the principles of the invention, it will be understood that the invention may be embodied otherwise without departing from such principles.

What is claimed is:

1. A reading and writing apparatus for IC coins comprising:
    a reception portion that receives an IC coin, said reception portion comprising a slide plate having a setting opening which is slightly larger than the IC coin;
    a reading and writing portion, said reception portion having a customer facing surface, and said reception portion moving the IC coin in a predetermined direction to send the IC coin to said reading and writing portion, said reading and writing portion retaining the received IC coin with surface of said received IC coin situated to be visually confirmed by the customer, said slide plate reciprocating obliquely upward and backward from the customer side;
    a reading and writing unit for the IC coin placed at the reading and writing portion; and
    a sorting portion that sorts the IC coin held at the reading and writing portion to a return portion;
    a storage portion, said sorting portion sorting the IC coin to the return portion or to said storage portion.

2. The reading and writing apparatus for IC coins as set forth in claim 1, wherein the sorting portion is a sorting member that is located under the reading and writing portion, and the sorting member can be selectively moved to a hold position located directly under the reading and writing portion, a return position moved to be located to the storage portion side, or a storage position moved to be located to the return portion side, from the hold position respectively.

3. The reading and writing apparatus for IC coins as set forth in claim 2, wherein the sorting member is a plate with its lower portion pivotably supported, and is selectively pivoted such that the top thereof is located directly under the reading and writing portion at the hold position, the top thereof is moved to the storage portion side at the return position, and the top thereof is moved to the return portion side at the storage position.

4. The reading and writing apparatus for IC coins as set forth in claim 1, further comprising an auxiliary movement device that, when the reception portion is moved obliquely upward and backward from the customer side, goes into a setting opening to press the IC coin.

5. The reading and writing apparatus for IC coins as set forth in claim 3, wherein the sorting member is selectively moved by a pair of solenoids which are arranged under the sorting member and between the path to the return portion and the path to the storage portion through links.

6. A reading and writing apparatus for IC coins comprising:
    a reception portion that receives an IC coin, said reception portion comprising a slide plate having a setting opening slightly larger than the IC coin;
    a reading and writing portion, said reception portion having a customer facing surface, and said reception portion moving the IC coin in a predetermined direction to send the IC coin to said reading and writing portion, said reading and writing portion retaining the received IC coin in a position visible by the customer facing said customer facing surface, wherein said slide plate reciprocates obliquely upward and backward from the customer side;
    a reading and writing unit for the IC coin placed at the reading and writing portion; and
    a passage for passing IC coins to a return portion.

7. The reading and writing apparatus for IC coins as set forth in claim 6, further comprising a sorting portion and a storage portion wherein said sorting portion sorts the IC coin to the return portion or to a storage portion.

8. The reading and writing apparatus for IC coins as set forth in claim 6, wherein the IC coin held at the reading and writing portion can be visually confirmed by viewing through the setting opening.

9. The reading and writing apparatus for IC coins as set forth in claim 7, wherein the sorting portion is an sorting member that is located under the reading and writing portion, and the sorting member can be selectively moved to a hold position located directly under the reading and writing portion, a return position moved to be located to the storage portion side, or a storage position moved to be located to the return portion side, from the hold position respectively.

10. The reading and writing apparatus for IC coins as set forth in claim 9, wherein the sorting member is a plate with its lower portion pivotably supported, and is selectively pivoted such that the top thereof is located directly under the reading and writing portion at the hold position, the top thereof is moved to the storage portion side at the return position, and the top thereof is moved to the return portion side at the storage position.

11. The reading and writing apparatus for IC coins as set forth in claim 6, further comprising an auxiliary movement device that, when the reception portion is moved obliquely upward and backward from the customer side, goes into the setting opening to press the IC coin.

12. The reading and writing apparatus for IC coins as set forth in claim 7, wherein the sorting member is selectively moved by a pair of solenoids which are arranged under the sorting member and between the path to the return portion and the path to the storage portion through links.

13. A reading and writing apparatus for IC coins comprising:
    a reception portion that receives an IC coin, said reception portion comprising a slide plate having a setting opening which is slightly larger than the IC coin;
    a reading and writing portion, said reception portion having a customer facing surface, and said reception portion moving the IC coin in a predetermined direction to send the IC coin to said reading and writing portion, said reading and writing portion retaining the received IC coin with surface of said received IC coin situated to be visually confirmed by the customer, wherein the IC coin held at the reading and writing portion is visually confirmed through the setting opening, said slide plate reciprocating obliquely upward and backward from the customer side;

a reading and writing unit for the IC coin placed at the reading and writing portion; and a sorting portion that sorts the IC coin held at the reading and writing portion to a return portion;

a storage portion, said sorting portion sorting the IC coin to the return portion or to said storage portion.

14. A reading and writing apparatus for IC coins comprising:

a reception portion that receives an IC coin;

a reading and writing portion, said reception portion having a customer facing surface, and said reception portion moving the IC coin in a predetermined direction to send the IC coin to said reading and writing portion, said reading and writing portion retaining the received IC coin with surface of said received IC coin situated to be visually confirmed by the customer;

a reading and writing unit for the IC coin placed at the reading and writing portion; and a sorting portion that sorts the IC coin held at the reading and writing portion to a return portion, said sorting portion being a sorting member located under the reading and writing portion;

a storage portion, said sorting portion sorting the IC coin to the return portion or to said storage portion, said sorting member being moveable from a hold position to a return position or a storage position, said sorting member being located directly under the reading and writing portion in said hold position, said sorting member being positioned at a storage portion side in said return position, said sorting member being located at a return portion side in said storage position, said sorting member being a plate with a lower portion pivotably supported, said plate being pivoted such that the top thereof is located directly under the reading and writing portion at the hold position, the top thereof is moved to the storage portion side at the return position, and the top thereof is moved to the return portion side at the storage position.

15. A reading and writing apparatus for IC coins comprising:

a reception portion that receives an IC coin;

a reading and writing portion, said reception portion having a customer facing surface, and said reception portion moving the IC coin in a predetermined direction to send the IC coin to said reading and writing portion, said reading and writing portion retaining the received IC coin with surface of said received IC coin situated to be visually confirmed by the customer;

a reading and writing unit for the IC coin placed at the reading and writing portion; and a sorting portion that sorts the IC coin held at the reading and writing portion to a return portion;

a storage portion, said sorting portion sorting the IC coin to the return portion or to said storage portion; and an auxiliary movement device, said auxiliary movement device being moveable such that said auxiliary movement device moves into a setting opening to press the IC coin when the reception portion is moved obliquely upward and backward from the customer side.

16. A reading and writing apparatus for IC coins comprising:

a reception portion that receives an IC coin;

a reading and writing portion, said reception portion having a customer facing surface, and said reception portion moving the IC coin in a predetermined direction to send the IC coin to said reading and writing portion, said reading and writing portion retaining the received IC coin with surface of said received IC coin situated to be visually confirmed by the customer;

a reading and writing unit for the IC coin placed at the reading and writing portion; and a sorting portion that sorts the IC coin held at the reading and writing portion to a return portion, said sorting portion being a sorting member located under the reading and writing portion;

a storage portion, said sorting portion sorting the IC coin to the return portion or to said storage portion, said sorting member being moveable from a hold position to a return position or a storage position, said sorting member being located directly under the reading and writing portion in said hold position, said sorting member being positioned at a storage portion side in said return position, said sorting member being located at a return portion side in said storage position, said sorting member being a plate with a lower portion pivotably supported, said plate being pivoted such that the top thereof is located directly under the reading and writing portion at the hold position, the top thereof is moved to the storage portion side at the return position, and the top thereof is moved to the return portion side at the storage position, said sorting member being selectively moved by a pair of solenoids, said solenoids being arranged under said sorting member and between the path to the return portion and the path to the storage portion through links.

17. A reading and writing apparatus for IC coins comprising:

a reception portion that receives an IC coin;

a reading and writing portion, said reception portion having a customer facing surface, and said reception portion moving the IC coin in a predetermined direction to send the IC coin to said reading and writing portion, said reading and writing portion retaining the received IC coin in a position visible by the customer facing said customer facing surface;

a reading and writing unit for the IC coin placed at the reading and writing portion;

a passage for passing IC coins to a return portion;

a sorting portion, said sorting portion being a sorting member located under the reading and writing portion; and a storage portion, said sorting portion sorting the IC coin to the return portion or to the storage portion, said sorting member being moveable from a hold position to a return position or a storage position, said sorting member being located directly under the reading and writing portion in said hold position, said sorting member being positioned at a storage portion side in said return position, said sorting member being located at a return portion side in said storage position, said sorting member being a plate with a lower portion pivotably supported, said plate being pivoted such that the top thereof is located directly under the reading and writing portion at the hold position, the top thereof is moved to the storage portion side at the return position, and the top thereof is moved to the return portion side at the storage position.

18. A reading and writing apparatus for IC coins comprising:

a reception portion that receives an IC coin;

a reading and writing portion, said reception portion having a customer facing surface, and said reception portion moving the IC coin in a predetermined direction to send the IC coin to said reading and writing portion, said reading and writing portion retaining the received IC coin in a position visible by the customer facing said customer facing surface;

a reading and writing unit for the IC coin placed at the reading and writing portion;

a passage for passing IC coins to a return portion; and an auxiliary movement device, said auxiliary movement device being moveable such that said auxiliary movement device moves into a setting opening to press the IC coin when the reception portion is moved obliquely upward and backward from the customer side.

* * * * *